United States Patent [19]

Andresen

[11] Patent Number: 4,613,936
[45] Date of Patent: Sep. 23, 1986

[54] CENTRALIZED GENERATION OF DATA TRANSFER ACKNOWLEDGE PULSES FOR MICROPROCESSORS

[75] Inventor: Mark E. Andresen, Norwalk, Conn.

[73] Assignee: International Business Machines Corporation, Armonk, N.Y.

[21] Appl. No.: 470,025

[22] Filed: Feb. 25, 1983

[51] Int. Cl.$^4$ ............................................. G06F 13/42
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,993,981 | 11/1976 | Cassarino, Jr. et al. | 364/200 |
| 4,042,972 | 8/1977 | Gruner et al. | 364/200 |
| 4,213,178 | 7/1980 | Diez et al. | 364/200 |
| 4,231,086 | 10/1980 | Tarbox et al. | 364/200 |
| 4,281,380 | 7/1981 | DeMesa et al. | 364/200 |
| 4,320,452 | 3/1982 | Kempf et al. | 364/200 |
| 4,357,658 | 11/1982 | Ouderaa | 364/200 |
| 4,365,294 | 12/1982 | Stoken | 364/200 |
| 4,390,944 | 6/1983 | Quackenbush | 364/200 |

Primary Examiner—David Y. Eng
Attorney, Agent, or Firm—James E. Murray

[57] ABSTRACT

Centralized generation of data transfer acknowledgment (DTACK) pulses is provided instead of providing each of the devices with their own DTACK pulse generation facilities. In this centralized DTACK generator, a number of gating circuits are gated on at different intervals by sequential pulses from a delay circuit. Device access lines from the microprocessor address decoder are all fed to one of these gates. When there is concurrence of one of the sequential pulses and a device access pulse at the inputs of one of the gates, the gate places an acknowledgment pulse on the DTACK line.

2 Claims, 4 Drawing Figures

CENTRALIZED GENERATION OF DATA TRANSFER ACKNOWLEDGE PULSES FOR MICROPROCESSORS

The present invention relates to control of data transfer cycles in a microprocessor and more particularly to the generation of a signal to regulate the length of a data transfer cycle of a microprocessor as a function of the response time of the device receiving or transmitting data to the microprocessor during the cycle.

Instead of having a fixed length data bus cycle time of sufficient duration to complete an exchange of data with the slowest of devices, microprocessors such as the Motorola MC68000 have controls to terminate a data bus cycle when the microprocessor receives a signal indicating the data transfer to or from an associated device is complete. When this signal, called a data transfer acknowledgment (DTACK) pulse, is transmitted to the microprocessor, circuitry, controlling the duration of the data bus cycle, it starts a sequence that ends in the termination of the data bus cycle. With this arrangement the data bus cycle length is tailored to the access time of each device the microprocessor interfaces so that the microprocessor is not held up waiting for data transfers that have already been accomplished.

It has been suggested that each of the devices interfacing the microprocessor be provided with facilities to generate a DTACK pulse at the completion of the transfer. This would require design of a plurality of pulse generation circuits for the different devices which would take into account characteristics of each device including their response time. Furthermore, with this arrangement of DTACK pulse generation, the microprocessor response time is affected by the number of devices on the DTACK line and the length of the lines coupling the devices to the DTACK line because of capacitive loading of the DTACK line.

BRIEF DESCRIPTION OF THE INVENTION

In accordance with the present invention a centralized DTACK generator is provided which overcomes the problems of providing each of the devices with their own DTACK pulse generation facilities. In this centralized DTACK generator, a number of gating circuits are gated on at different intervals by sequential pulses from a delay circuit. Device access lines from the microprocessor address decoder are all fed to one of these gates. When there is concurrence of one of the sequential pulses and a device access pulse at the inputs of one of the gates, the gate places an acknowledgement pulse on the DTACK line.

In the illustrated embodiment of the invention, the sequential gating signals are generated in the DTACK generator by a shift register. When any device is associated with the microprocessor, its operational response time is determined and the stage of the shift register providing the proper delay is connected to the gating circuit receiving that devices access signal. When any device is changed or added, the timing of its DTAC signal can easily be modified to accommodate the new device.

Furthermore, in this preferred embodiment the centralized DTACK has only one output line connected to the DTACK line and the DTACK generator is located a short fixed distance from the microprocessor so that the microprocessor's response is unaffected by the number of associated devices coupled to the microprocessor or their distance from the microprocessor.

Therefore, it is a object of the present invention to provide a new means of generating a signal used to regulate the length of data bus cycles in microprocessors as a function of device response time.

It is another object of the present invention to provide new means of generating a signal to regulate the length of data bus cycles in microprocessors that is adjustable to provide changes in devices attached to the microprocessor.

It is a further object of the invention to provide apparatus for the generation of the signals that regulate the length of data cycles in microprocessors which does not cause loading down of the microprocessor and slowing of its response time.

THE DRAWINGS

These and other objects of the invention are best understood by reference to the accompanying figures illustrating an embodiment of the invention of which:

DETAILED DESCRIPTION

Figure 1:
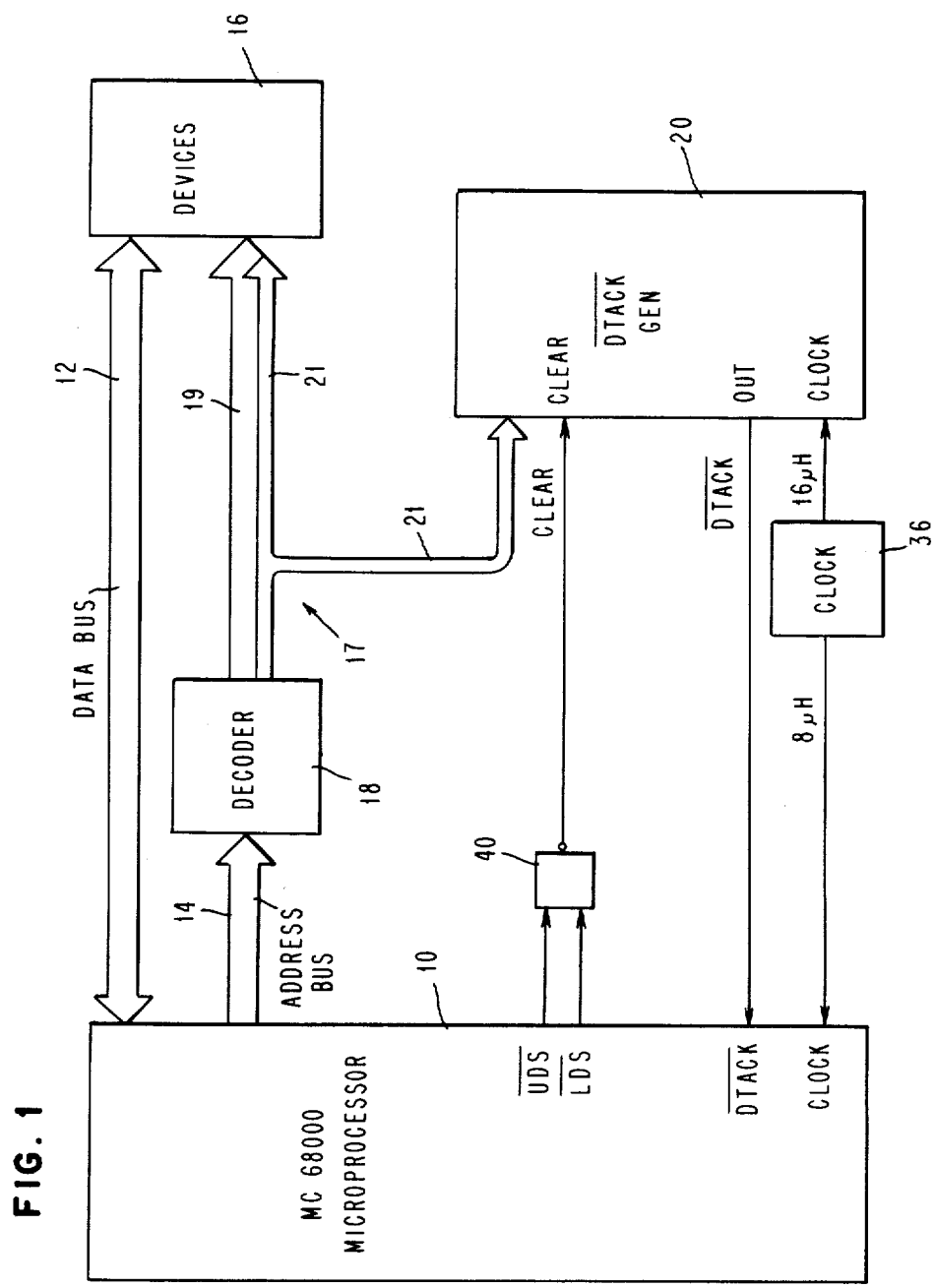
FIG. 1 is a block diagram of the present invention showing how it interacts with the microprocessor and the attached devices.

The MC68000 microprocessor 10 contains a 16 bit bidirectional general purpose data bus 12 for the transfer of data between the microprocessor 10 and a plurality of associated devices 16. The microprocessor also has a 23 bit unidirectional address bus 14 capable of addressing 8 megawords of data on associated devices 16. The address bus signal from the microprocessor is fed into a decoder 18 which selects a device access line and the address of a storage location at a device. The device access line enables only one of the plurality of devices attached to the bus 17 to respond to the address of the storage location portion of the output of decoder 18.

Figure 2:
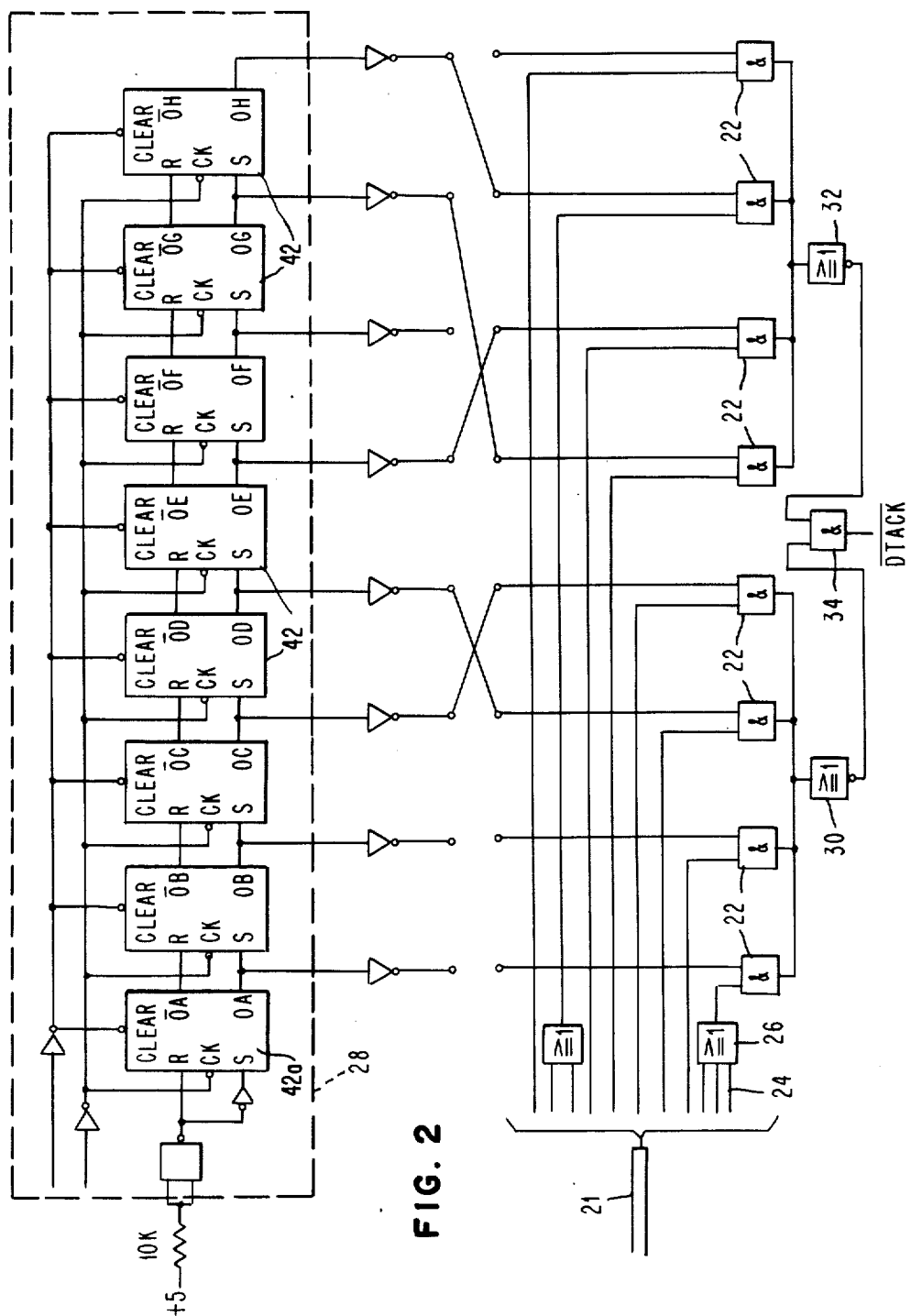
FIG. 2 is a more detailed schematic of the block referred to as DTACK generator in FIG. 1.

The portion 21 of the bus 17 containing the device access lines is fed to the DTAC generator 20. As shown in FIG. 2 each of the access lines 24 from the decoder 18 is fed to an AND gate 22. When two or more devices 16 have similar response times all their device access lines 24 can be fed into an OR gate 26 whose output goes to a single AND gate 22.

Each of the AND gates 22 is gated by an output from one stage 42 of a shift register 28 of the type described in the second edition of a handbook entitled "The TTL Data Book" published by Texas Instruments Incorporated on pages 7-0206 and 7-207. When concurrence occurs at the inputs of an AND gate 22, between a device access signal and the output from the shift register 28, the result is the generation of a pulse at the output of that AND gate 22. The outputs of the AND gates 22 are grouped together in two groups and fed to OR gate 30 or 32. The outputs of the OR gates 30 or 32 is an input to an AND gate 34 so that so long as there are no up outputs from the AND gates 22, AND gate 34 is enabled. However, when there is a concurrence at the inputs of one of the AND gates 22 of a timing pulse from the shift register 28 with an address access signal from the decoder, the AND gate 34 is disabled providing the DTACK signal that starts the timing out process for the microprocessor.

The clock input to the shift register 28 is from the clock 36 providing the clocking pulses to the microprocessor 10. However, the clock pulses to the shift register 28 occur at twice the rate as the clock to the microprocessor 10. As shall be seen hereinafter the use of a clock pulse rate twice that of the microprocessor enables better resolution of the DTACK signal. The input signal to the shift register 28 is a fixed positive voltage assuring that the first stage 42a of the shift register 28 will always contain a binary one in the absence of a clear signal. With each successive clock pulse, this one is moved from one stage 42 to next stage 42 of the shift register 28 until every stage 42 of the register 28 contains a one.

The clear signal is used to clear the register of the binary ones stored in its stages of the data cycle. This clear signal is generated from the $\overline{UDS}$ and $\overline{LDS}$ signals of the microprocessor 10. The $\overline{UDS}$ and $\overline{LDS}$ signals are used to control data on the data bus 12 of the microprocessor. Their function is described along with the function of the $\overline{DTACK}$ signal in Section 4 of the third edition of a manual entitled "MC 68000, 16 Bit Microprocessor Users Manual", published by Prentice Hall. When both of the $\overline{UDS}$ and $\overline{LDS}$ outputs are up there is no valid data on the bus 12. When either or both the $\overline{UDS}$ and $\overline{LDS}$ outputs are down there is valid data on the data bus 12. To generate the clear signal the $\overline{UDS}$ and $\overline{LDS}$ outputs are fed to an OR gate 40. When neither of the $\overline{UDS}$ or $\overline{LDS}$ output is down, the output of OR gate 40 is up. This up output of OR gate 40 is the clear input to the shift register 28. So long as the output of gate 40 remains up, all stages 42 of the shift register 28 are held in the zero state so that none of the gates 22 can be enabled. However, when either the UDS or LDS signal goes down, the output of the OR gate 40 goes down. Then the one level placed into the first stage 41 of the shift register is shifted by the clock pulses in sequence to the other stages.

The shifting occurs at the shift register clock rate so that gates 22 will enable the AND gates 22 one after the other at that interval. As a result, the DTACK signal can be generated during any one of those intervals. When a device is associated with the microprocessor, its worst case response time is determined and a connection is made between the AND gate 22 coupled to the access line for that device and the stage 42 of the shift register 28 which provides the necessary delay. For instance, assume the device 16 is a file and requires significant time to respond to the microprocessor 10. The appropriate gate 22 would be connected to output of one of the later stages of the shift register 28 so that the DTAC signal would not be sent out until after the data transfer has been completed to the file.

Figure 4:
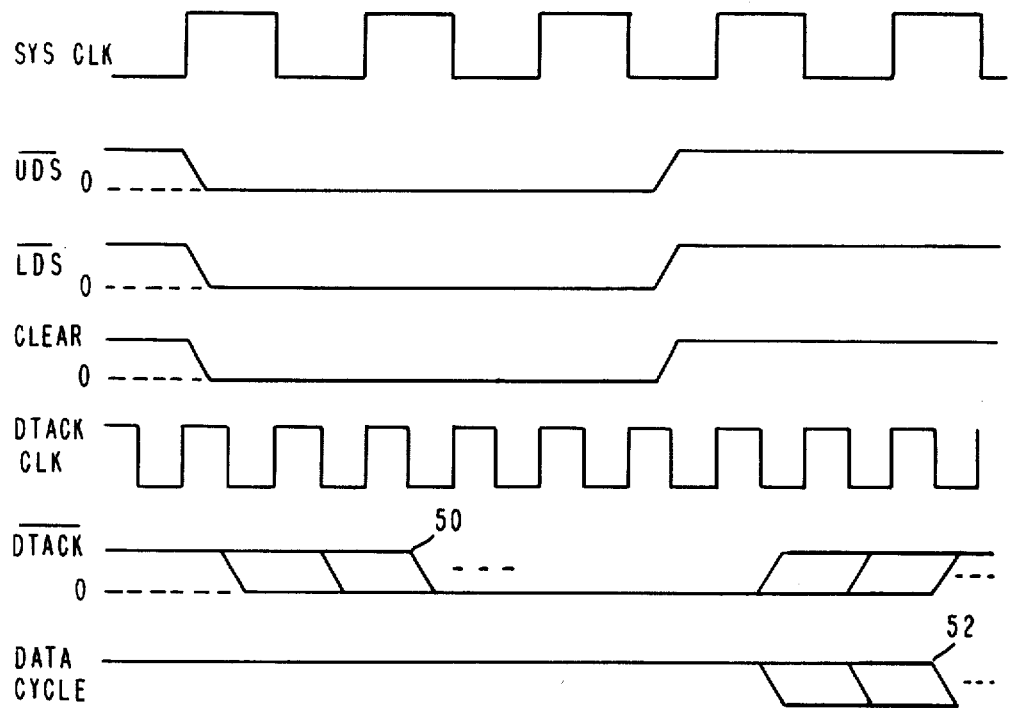
FIG. 4 is a timing diagram of the various signals mentioned in connection with the diagrams of FIGS. 1 and 2.

In FIG. 4, it can be seen that delays to the DTACK signal result in an extension 52 in the data cycle. This is not a one to one relationship. In other words, an additional delay of one DTACK clock cycle does not necessarily result in an extension of the length of the data cycle by an equal amount. The effect of the additional delay is dependent on factors internal to the microprocessor in addition to the drop of the DTACK signal. However, of any given delay of the DTACK signal does not provide an extension of the data cycle, an adequate delay of the DTACK signal can be arrived at by cut and try procedures.

Figure 3:
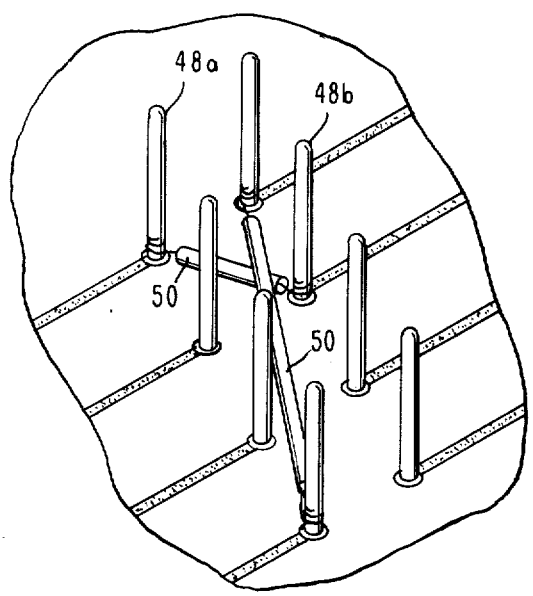
FIG. 3 shows a wire wrap technique that can be used to adjust response times for the DTACK signal produced by the DTACK generator of FIG. 2.

As shown in FIG. 3 inputs to the AND gates and the outputs of the shift register can be wire wrap terminals 48. When the response time of the device is determined, a wire 49 is wrapped between the appropriate wire wrap output terminal 48a of the shift register and the wire wrap input terminal 48b to the AND gate receiving its device access signal.

Therefore, it should be understood that many modifications and changes can be made in the illustrated embodiment without departing from the spirit and scope of the invention as represented by the attached claims.

Having thus described my invention, what I claims as new, and desire to secure by Letters Patent is:

1. In a data processing system having a processor and a plurality of I/O devices interconnected by a bus system including an address bus with device access lines for carrying device access signals, a data bus and a control bus, said control bus including a first line means connected to said processor for providing a data transfer acknowledgment signal thereto indicating completion of a data transfer, and second line means for transferring data strobe signals indicating valid data on said data bus, in combination therewith a common data transfer acknowledgment signal generator for the plurality of I/O devices comprising:

timing means coupled to said second line and responsive to said data strobe signals thereon for generating a timed response signal at a point in time reflecting the response time of any particular one of the plurality of I/O devices involved the data transfer; and logic means coupled to said timing means, said access lines and said first for providing a data transfer acknowledgment signal in response to said timed response signal and an access signal for said any particular one of said plurality of I/O devices wherein said logic means includes a plurality of gate means each responsive to an I/O device access signal on said address bus and to a timed response signal of said timing means to generate a data transfer acknowledgement signal on the concurrent receipt of said access and timed response signals and wherein said timing means includes delay circuit means providing a plurality of sequentially occurring timed response signals at different output terminals of said delay circuit means after being enabled by said strobe signals.

terminal means for selective coupling one of said output terminals of said delay circuit means to one of said gate means to select the timing of the data transfer acknowledgement pulse for any one of the plurality of I/O device means.

2. The data processing system of claim 1 wherein said logic means has only one output connection to said first line.

* * * * *